Figure 1:
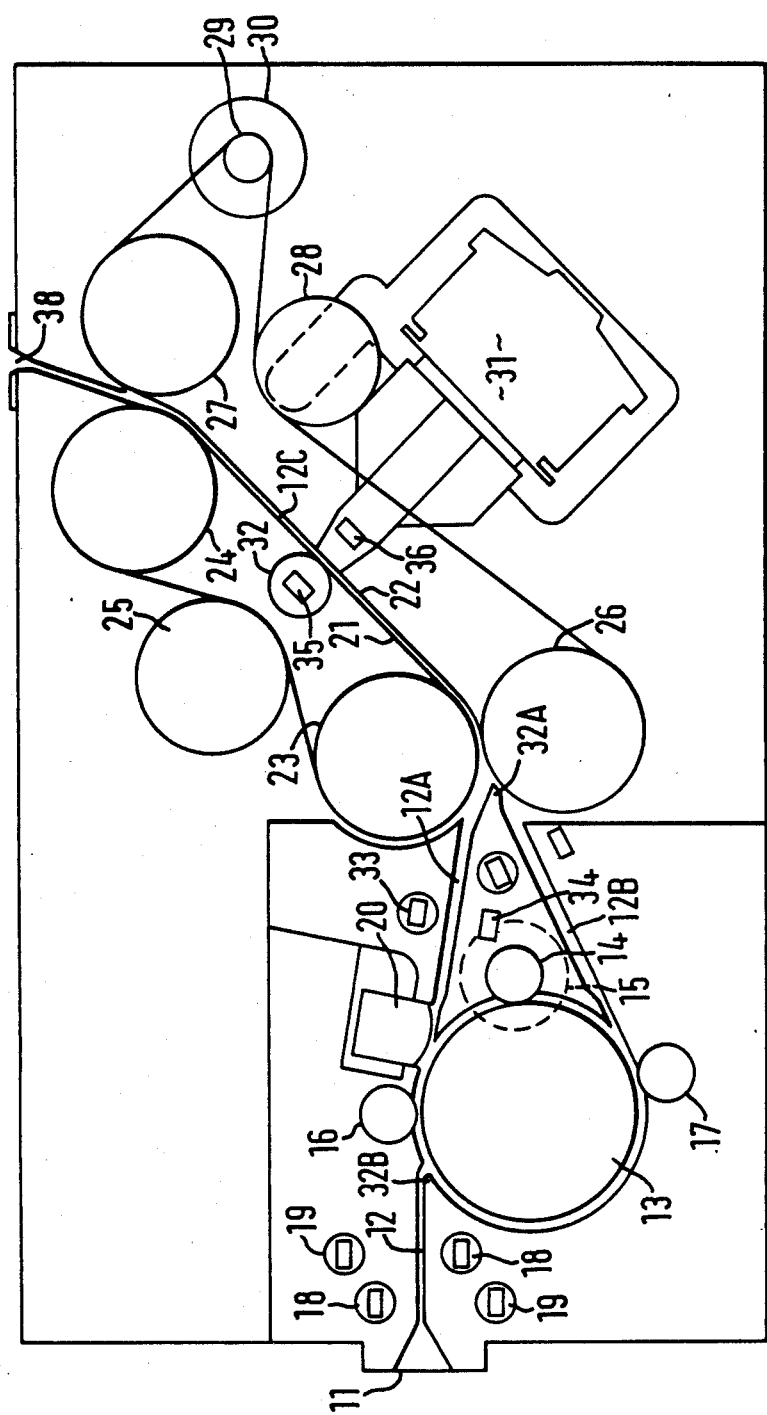

United States Patent [19]
McCarthy

[11] Patent Number: 4,613,747
[45] Date of Patent: Sep. 23, 1986

[54] TICKET READING DEVICE

[75] Inventor: Paul R. McCarthy, Hillingdon, England

[73] Assignee: Almex Ticket Machine Company Limited, United Kingdom

[21] Appl. No.: 632,771

[22] Filed: Jul. 20, 1984

[30] Foreign Application Priority Data

Jul. 22, 1983 [GB] United Kingdom ............ 8319865

[51] Int. Cl.⁴ .................................. G06K 13/08
[52] U.S. Cl. .................... 235/480; 209/534; 209/586; 235/477
[58] Field of Search ........... 235/437, 477, 480, 475, 235/380, 438, 382; 209/534, 540, 586

[56] References Cited

U.S. PATENT DOCUMENTS

| | | | |
|---|---|---|---|
| 3,646,325 | 2/1972 | George | 235/480 |
| 3,873,443 | 3/1975 | Cothran et al. | 209/586 |
| 3,930,581 | 1/1976 | Gray | 209/534 |
| 4,126,780 | 11/1978 | Rosenthal et al. | 235/380 X |

FOREIGN PATENT DOCUMENTS

| | | |
|---|---|---|
| 314236 | 3/1974 | Austria . |
| 0077454 | 4/1983 | European Pat. Off. . |
| 1574090 | 12/1971 | Fed. Rep. of Germany . |
| 2115171 | 8/1973 | Fed. Rep. of Germany . |
| 2557984 | 6/1977 | Fed. Rep. of Germany . |
| 1273953 | 5/1972 | United Kingdom . |
| 1330669 | 9/1973 | United Kingdom . |
| 1485041 | 9/1977 | United Kingdom . |
| 2111956 | 7/1983 | United Kingdom . |
| 2111957 | 7/1983 | United Kingdom . |
| 2131005 | 6/1984 | United Kingdom . |

*Primary Examiner*—David L. Trafton
*Attorney, Agent, or Firm*—Nilsson, Robbins, Dalgarn, Berliner, Carson & Wurst

[57] ABSTRACT

A ticket verification and reading device has a single reading and writing head (20). If a card to be read is inserted incorrectly into the entry (11), rollers (23) and (13) rotate so as to return the ticket, inverting it as it passes round roller (13). The correctly oriented ticket is then returned to the roller (13) from when it passes the reading and writing head (20) to be read.

Accordingly the device will accept incorrectly inserted cards, automatically re-orientating them so that even though the device has only one reading head (20) the cards can be read and, if necessary, verified.

8 Claims, 9 Drawing Figures

TICKET READING DEVICE

This invention relates to a ticket or card verification and reading device of the kind which may be incorporated in a ticket machine, cash dispenser, gate control unit or in any other location where ability to read and identify information on a ticket or card is important.

Tickets or cards conventionally have magnetic information printed on them usually in the form of a stripe containing the information running longitudinally on the card and on one side only of the card. To enable the information to be read it is necessary to insert the ticket or card into the machine the right way round and the right way up. Many machines will reject tickets and cards wrongly inserted. Some machines have a multiplicity of reading heads to ensure that the card is read even if inserted the wrong way up.

An object of the present invention is to provide a ticket or card verification and reading device which has only one reading head but will accept a ticket or card and automatically re-orientate it, if necessary, to read it.

According to the invention a ticket or card verification and reading device comprises a single reading head and has means to determine whether a card is inserted the correct way up and the correct way round and means to re-orientate the ticket or card automatically to the correct readable orientation so as to enable the single reading head to read the ticket or card.

Preferably the device incorporates a magnetic writer in the read head.

The means to determine whether the card is inserted correctly may comprise a number of sensors and/or the read head which sense the width and length of the card.

The means to re-orientate the ticket or card may include one or more reversible belt conveyors and drive rollers.

Preferably the ticket is driven past the read head and, if it is upside down, it is then automatically reversed around the drive roller to invert it, returned to the entry position and then automatically reprocessed to read the card and then optionally magnetically written and returned to the entry drive roller to be passed over the single read head to verify it.

Thus a single read head is used to deal with the ticket no matter which way up or round the card or ticket is inserted and the device has the ability to read, write, verify and print information on a card or ticket with the use of only one read/write head and one print head.

In the accompanying drawings:

FIG. 1 is a side elevation of a ticket or card verification and reading device embodying the present invention; and FIGS. 2 to 9 illustrate diagrammatically the steps involved in reading, writing and verifying a card or ticket using the device shown in FIG. 1.

As shown in FIG. 1 the device comprises a compact casing 10 with an entry 11 for a ticket or card, leading to a flow path 12 and drive roller 13 driven by a spindle 14 of a motor 15. Pinch rollers 16, 17 are provided on each side of drive roller 13.

Adjacent the entry 11 are card width and length checking devices 18, 19 respectively.

A reading and writing head 20 is located adjacent drive roller 13. The path 12 is extended at 12A and also includes a reverse path 12B. At the end of path 12A is a transporter consisting of a pair of drive bands 21 and 22 which are held closely together along the portion of the path marked 12C. Drive band 21 is carried on rollers 23, 24 and tensioned by tension device 25. Band 22 is carried on rollers 26 and 27 and tensioned by tension device 28. Band 22 is driven by spindle 29 of motor 30.

A printer 31 is also provided with a print anvil 32 to enable cards or tickets to be printed whilst travelling along path 12C. The printer may be a dot-matrix printer, for example a thermal printer or an impact printer using a ribbon. There are print position sensors 35, 36 to ensure that the ticket is correctly positioned during printing.

The motors driving roller 13 and band 22 are both reversible so as to drive the card or ticket in either direction as required.

The operation of the device will now be described with reference to FIGS. 2 to 9.

Figure 2:
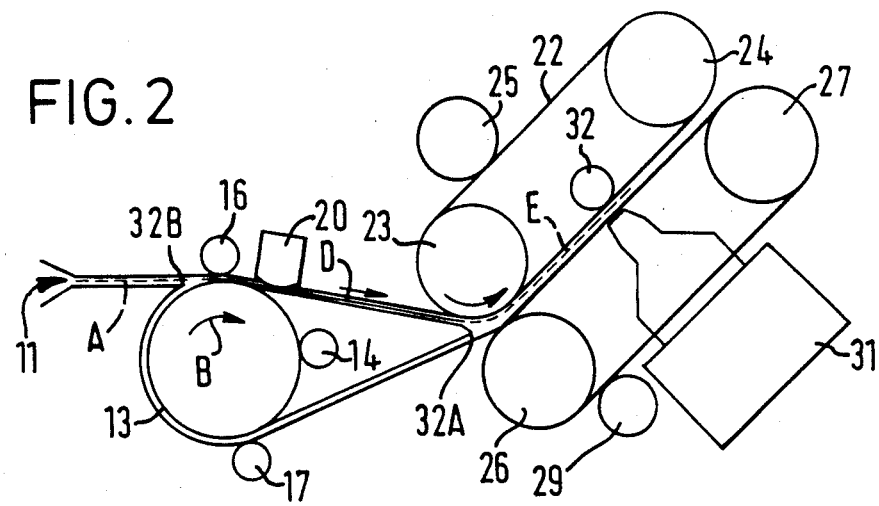

Assuming that a ticket or card is printed with a conventional oxide stripe running the length of one side of the ticket, it will, if correctly inserted into the device, have the oxide strip uppermost. FIG. 2 shows this case. The ticket is propelled by roller 13 from right to left as shown in FIG. 2 by the dotted line A, the roller 13 being rotated in the direction of arrow B. The ticket is gripped between pinch roller 16 and drive roller 13 and driven past the read head 20. Before reaching the drive roller 13 the width of the ticket will have been checked by devices 18 and 19 (shown in FIG. 1).

Length and width checks are provided as follows: Minimum and maximum width is checked by pairs of sensors 18 an 19 respectively. The first sensors 18, 19 also provide the datum position for length check, the other end of the length check being effected by sensors 33, 34. The length check enables the controller to know where the ticket is to avoid loss between the drive roller and the drive belts. A ticket which is too short will be rejected by the system. Similarly a ticket which is too wide or too narrow will be rejected. If the ticket contains appropriate information in the oxide strip it will follow the path shown by firm line D and dotted line E, being deflected by a static diverter 32A.

Figure 3:
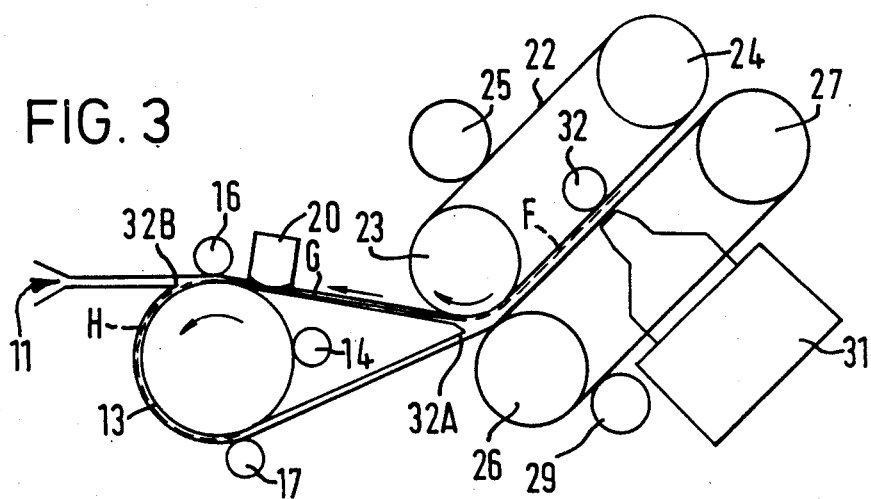

The ticket may then either be ejected or it may be written on by printer 31. The printing operation is illustrated in FIG. 3. The two motors are reversed to drive the ticket from right to left along the path marked F, G, H, and the ticket is printed by the printer 31, reference 32B denoting another static diverter.

Figure 4:
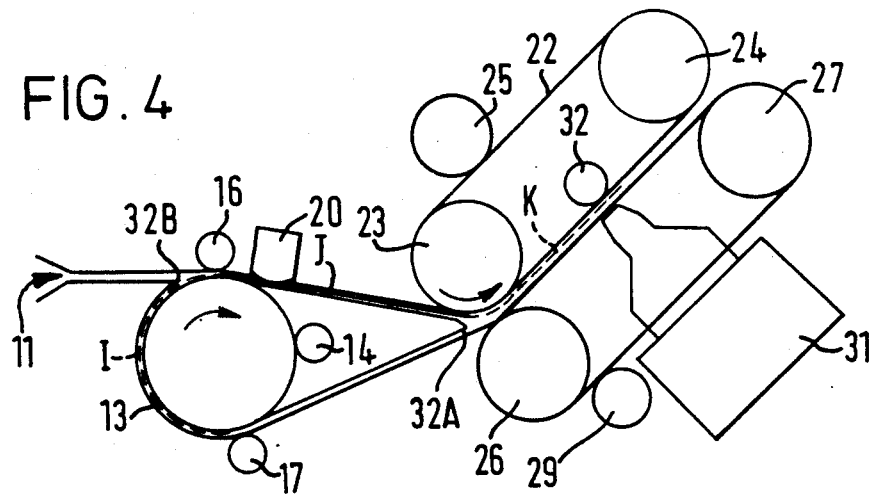

To verify the information encoded on the ticket, the motors are reversed again as shown in FIG. 4 to drive the ticket past the read head along the path I, J, K.

Figure 5:
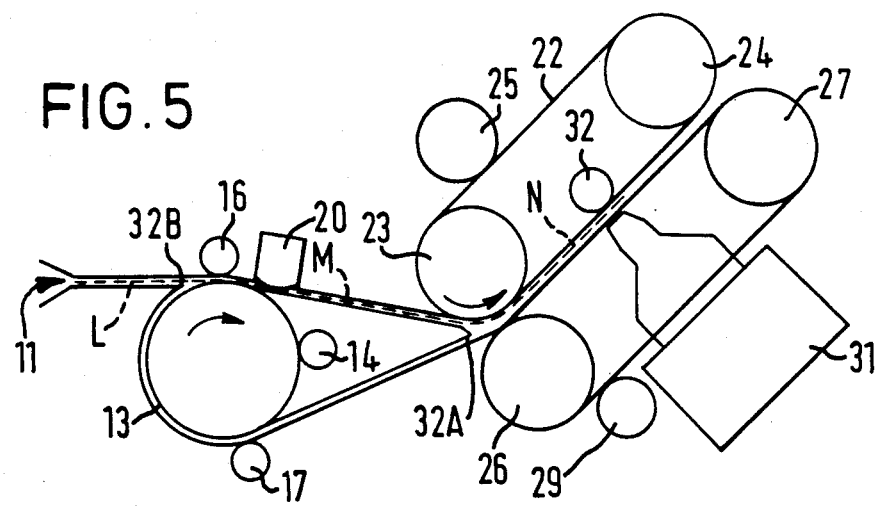
Figure 6:
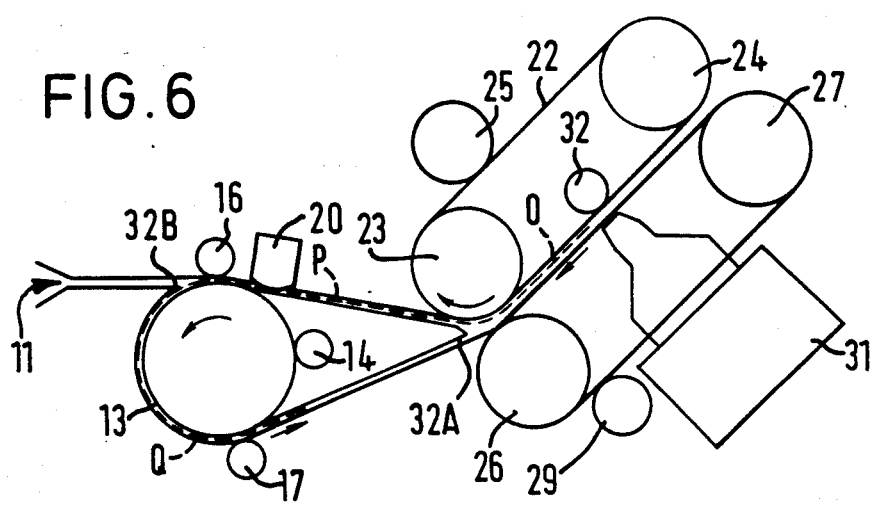

Assuming now that the ticket is wrongly inserted with oxide down, the operation of the device is shown in FIGS. 5 to 9. The ticket passes along path L, M, N as shown in FIG. 5. Because the reader indicates no information encoded on the ticket the device automatically returns the ticket along path O, P, Q shown in FIG. 6, so that the ticket is inverted as it passes around drive roller 13.

Figure 7:
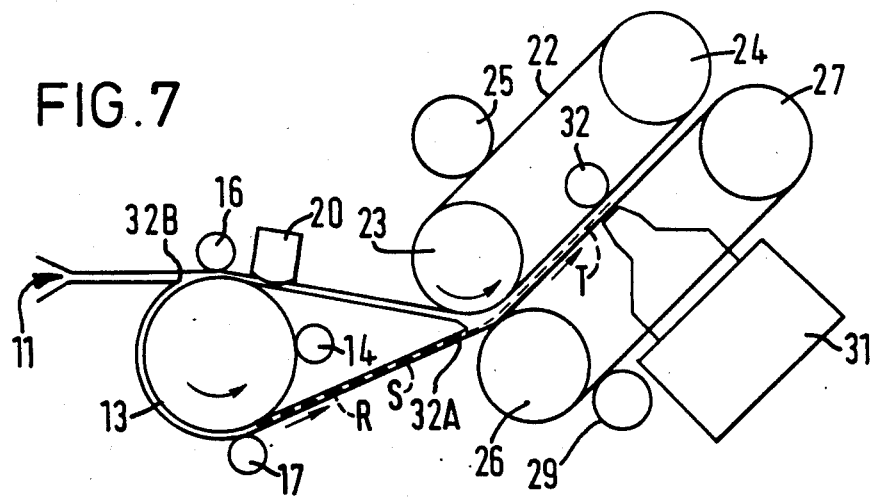
Figure 8:
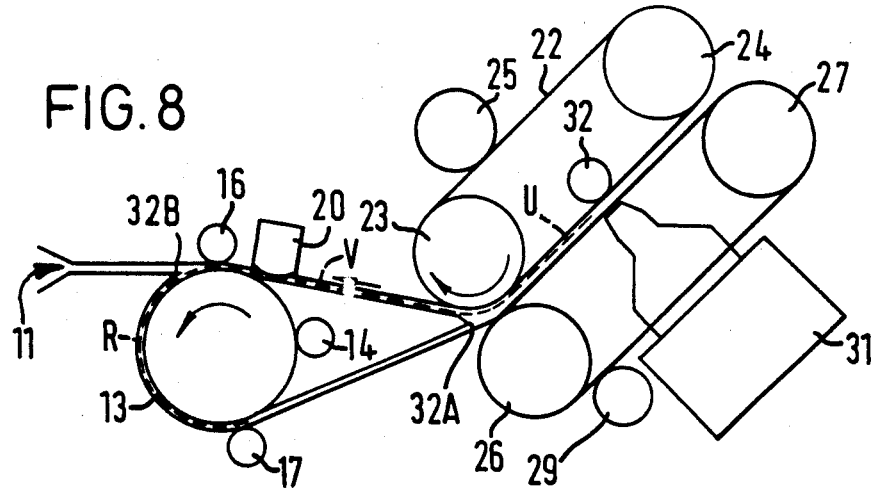
Figure 9:
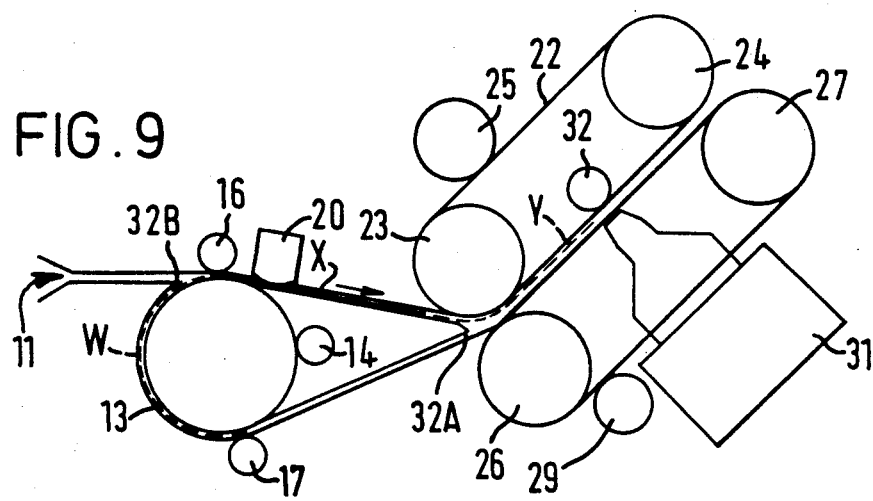

The oxide-down ticket has now been inverted to oxide up and follows the path R, S, T shown in FIG. 7. The ticket is then returned along path U, V, R shown in FIG. 8 so that it is correctly positioned at R with oxide up to travel through the device again from left to right, as shown in FIG. 9, along path W, X, Y. The ticket is then read and the remaining operations follow the sequence described with reference to FIGS. 2, 3 and 4 above, the ticket finally exiting through exit mouth 38 (see FIG. 1).

Printing may be effected on either or both sides of the ticket as desired by the operator because the device can invert the ticket when two-side printing is required.

The device as described handles a ticket or card with the magnetic stripe positioned centrally on one side.

By adding a second head in parallel to the first it is possible to handle a ticket with an edge stripe i.e. positioned as for a bank or credit card.

This will then provide four way round read, write, verification with only two heads (the minimum numbr would normally be eight).

I claim:

1. A ticket or card verification and reading device whereby the ticket or card has data only on one side thereof, the device comprising:
    a single reading head;
    a reversible input roller;
    means for driving said input roller a first rotational direction and a second rotational direction which is opposite said first rotational direction;
    said input roller moving the ticket or card from an input region of the device to a region further into the device when said driving means drives said input roller in said first rotational direction;
    said driving means drives said input roller in said second rotational direction when the ticket or card is inserted into the device such that the side opposite the data side faces said single reading head; and
    said input roller rotating in said second rotational direction moves the ticket or card from said further region to said input region and around said input roller and returning it to said further region thereby turning the ticket or card over.

2. A device as claimed in claim 1, wherein the reading head incorporates a magnetic writer.

3. A device as claimed in claim 1, further comprising a plurality of sensors which sense the width and length of the ticket or card.

4. A device as claimed in claim 1, further comprising a reversible belt conveyor, a reversible roller, and a means for driving said reversible belt conveyor and said reversible roller.

5. A device as claimed in claim 1, wherein said reading head is in said input region and, if the ticket or card is in said further region with the data side facing said reading head, said drive means and said input roller rotate to return the ticket or card towards the input region to be read by the reading head.

6. A method of reading a ticket or card inserted into a ticket or card verification and reading device having a single reading head whereby the ticket or card has data only on one side thereof, the method comprising the steps of:
    determining whether the ticket or card is inserted with the data side facing the single reading head;
    driving a reversible input roller in a first rotational direction and a second rotational direction which is opposite said first rotational direction;
    moving the ticket or card from an input region of the device to a region further into the device when said input roller is driven in said first rotational direction;
    driving said input roller in said second rotational direction when the ticket or card is inserted into the device such that the side opposite the data side faces the single reading head, whereby rotating said input roller in said second rotational direction moves the ticket or card from said further region to said input region and around said input roller thereby turning the ticket or card over and returning it to said further region.

7. A method as claimed in claim 6, wherein with the data side of the ticket or card facing the reading head and the ticket or card in said further region, returning it to said input region for it to be read by the reading head.

8. A method as claimed in claim 7, wherein after the ticket or card has been returned to the input region and read by the single reading head, it is magnetically written and redriven past the reading head.

* * * * *